United States Patent
Rama et al.

(10) Patent No.: US 12,051,019 B2
(45) Date of Patent: Jul. 30, 2024

(54) ELECTRONIC CATALOG PUBLISHING

(71) Applicant: SAP SE, Walldorf (DE)

(72) Inventors: Harish Kumar Sampangi Rama, Bangalore (IN); Anand Jain, Bangalore (IN); Dhruv Parikh, Bangalore (IN); Krishnamoorthi Sukumar, Bangalore (IN)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 17/543,202

(22) Filed: Dec. 6, 2021

(65) Prior Publication Data

US 2023/0177423 A1    Jun. 8, 2023

(51) Int. Cl.
*G06F 16/958* (2019.01)
*G06Q 10/0631* (2023.01)

(52) U.S. Cl.
CPC ..... *G06Q 10/06312* (2013.01); *G06F 16/958* (2019.01); *G06Q 10/06316* (2013.01)

(58) Field of Classification Search
CPC ........ G06Q 10/06312; G06Q 10/06316; G06F 16/958
See application file for complete search history.

(56) References Cited

U.S. PATENT DOCUMENTS

| | | | |
|---|---|---|---|
| 2015/0006470 A1* | 1/2015 | Mohan | G06F 16/283 707/603 |
| 2017/0097818 A1* | 4/2017 | Heine | H04L 67/34 |
| 2018/0131556 A1* | 5/2018 | Band | H04L 67/565 |
| 2021/0073026 A1* | 3/2021 | Myers | G06F 11/3065 |

* cited by examiner

*Primary Examiner* — Sisley N Kim
(74) *Attorney, Agent, or Firm* — Mintz Levin Cohn Ferris Glovsky and Popeo, P.C.

(57) ABSTRACT

A method, a system, and a computer program product for executing catalog publishing. A request to publish an online catalog is received. An online catalog includes a plurality of catalog items. A determination of publishing priority of the online catalog is automatically triggered based on at least one first parameter associated with the received request and at least one catalog item in the online catalog. At least one second parameter associated with the received request and at least one catalog item in the one online catalog is detected, and based on the detecting, the determined publishing priority of the online catalog is updated. A queue for publishing at least one online catalog in a plurality of online catalogs is generated using the determined publishing priority of each online catalog in the plurality of online catalogs and the updated determined publishing priority of the online catalog. Publishing of the plurality of online catalogs is executed using the queue.

20 Claims, 7 Drawing Sheets

Sample catalog item (field names and values)
Supplier ID: "Acme Corp"
Supplier Part ID: "12345"
Manufacturer Part ID: "45678"
Item Description: "An unbreakable tennis ball. Can be used to play tennis and cricket."
SPSC Code: "ABCD"
Unit Price: 10
Unit of Measure: "Each"
Lead Time: 7
Manufacturer Name: "Wonka Industries"
Currency: "USD"
Short Name: "Tennis ball"
Image: "www.wonka.com/tennis_ball"
Expiration Date: "Jan 1 2000"

ELECTRONIC CATALOG PUBLISHING

TECHNICAL FIELD

This disclosure relates generally to data processing and, in particular, to executing online electronic catalog publishing processes.

BACKGROUND

In today's world, companies' websites serve as a place where buyers are able to look for different products and, upon locating the desired ones, are able to purchase them by adding the products to a virtual shopping cart and paying for them. This is referred to as e-commerce or online shopping. Online shopping allows more detailed information (including audio and video) to be shown, and allows for faster ordering of items. The buyers are able to browse companies' electronic catalogs so that they can locate the products they want. Thousands of catalogs are published every single day from hundreds of sources (e.g., companies, distributors, etc.). Some such sources are able to generate and request publishing of all of their catalogs thereby consuming a significant amount of resources, leaving other sources unable to publish any of their own catalogs when needed (e.g., before a particular shopping season) and/or within reasonable amount of time. Thus, it is important that publishing resources are allocated in an appropriate manner to ensure that they are not overly consumed by single source entities.

SUMMARY

In some implementations, the current subject matter relates to a computer implemented method for executing publishing of catalogs. The method may include receiving a request to publish an online catalog in a plurality of online catalogs. Each online catalog in the plurality of online catalogs may include a plurality of catalog items. Each online catalog may be configured to be published in a communication network. The method may further include automatically triggering, based on at least one first parameter associated with at least one of the received request and at least one catalog item in at least one online catalog in the plurality of online catalogs, a determination of publishing priority of each online catalog in the plurality of online catalogs, and determining publishing priority of each online catalog in the plurality of online catalogs. At least one second parameter associated with the received request and the catalog item in at least one online catalog in the plurality of online catalogs may be detected, Based on the detecting, the determined publishing priority of at least one online catalog in the plurality of online catalogs may be updated. The method may also include generating a queue for publishing at least one online catalog in the plurality of online catalogs using the determined publishing priority of each online catalog in the plurality of online catalogs and the updated determined publishing priority of at least one online catalog in the plurality of online catalogs, and executing, using the generated queue, publishing of the plurality of online catalogs in the communication network.

In some implementations, the current subject matter may include one or more of the following optional features. One or more online catalogs in the plurality of online catalogs may be published using at least one of the following: an incremental catalog publishing, a full catalog publishing, and any combination thereof. An incremental catalog publishing may include publishing one or more items of one or more catalogs in the plurality of online catalogs. A full catalog publishing may include publishing all items included in one or more catalogs.

In some implementations, the first parameter (e.g., priority parameter) may include at least one of the following: a number of incremental catalog publishings, a number of full catalog publishings, a number of catalog items included in the one or more online catalogs, a number of cleansing rules applicable to one or more catalog items included in the one or more online catalogs, a number of enrichment rules applicable to one or more catalog items included in the one or more online catalogs, and any combination thereof. Execution of a cleansing rule may be configured to exclude one or more catalog items from being published together with the one or more online catalogs. An execution of an enrichment rule may be configured to add and/or update data to one or more items in one or more online catalogs for publishing.

In some implementations, the second parameter (e.g., overriding rules parameter) may be associated with one or more overriding rules being indicative of a change in publishing priority of at least one online catalog in the plurality of online catalogs.

In some implementations, each catalog item may be published using metadata associated with a corresponding online catalog in the plurality of online catalogs.

In some implementations, a highest value of a priority determined for an online catalog in the plurality of online catalogs using at least one second parameter may correspond to a lowest publishing priority of the online catalog in the generated queue.

In some implementations, the method may also include storing the published online catalogs at a storage location.

In some implementations, the generated priority queue may include at least one of the following: an existing priority queue (e.g., priority queue that may already exist and new catalog publish jobs may be added to it), a newly generated priority queue, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 4 illustrates an exemplary catalog item, according to some implementations of the current subject matter;

DETAILED DESCRIPTION

To address these and potentially other deficiencies of currently available solutions, one or more implementations of the current subject matter relate to methods, systems, articles of manufacture, and the like that may, in some implementations, provide a computing environment for electronic online catalog publishing.

In some implementations, the current subject matter relates to an electronic online catalog publishing scheduling scheme that is capable of preventing a select few catalog source entities to submit a large number of catalog publish jobs and consume all available catalog publishing resources. The current subject matter system may be configured to distribute catalog publishing resources to ensure that such resources are fairly distributed among different catalog source entities, an average waiting time for catalog publish jobs may be as small as possible. It should be noted that if only one catalog source entity is publishing catalog publish jobs, no catalog publish job throttling would be needed or possible. The current subject matter may also be configured to override the above scheduling scheme using one or more exceptions. The current subject matter system may be configured to maintain information that may be used to determine publishing resources consumed by various catalog source entities as part of their catalog publish jobs. Whenever a catalog publish job shows up for any particular catalog source entity, the current subject matter system may be configured to determine a "priority" for it using various data associated with the catalog publish job. The catalog publish job may then be added to a priority queue, using which, catalog publish jobs may be executed based on their determined priority.

Figure 1A:
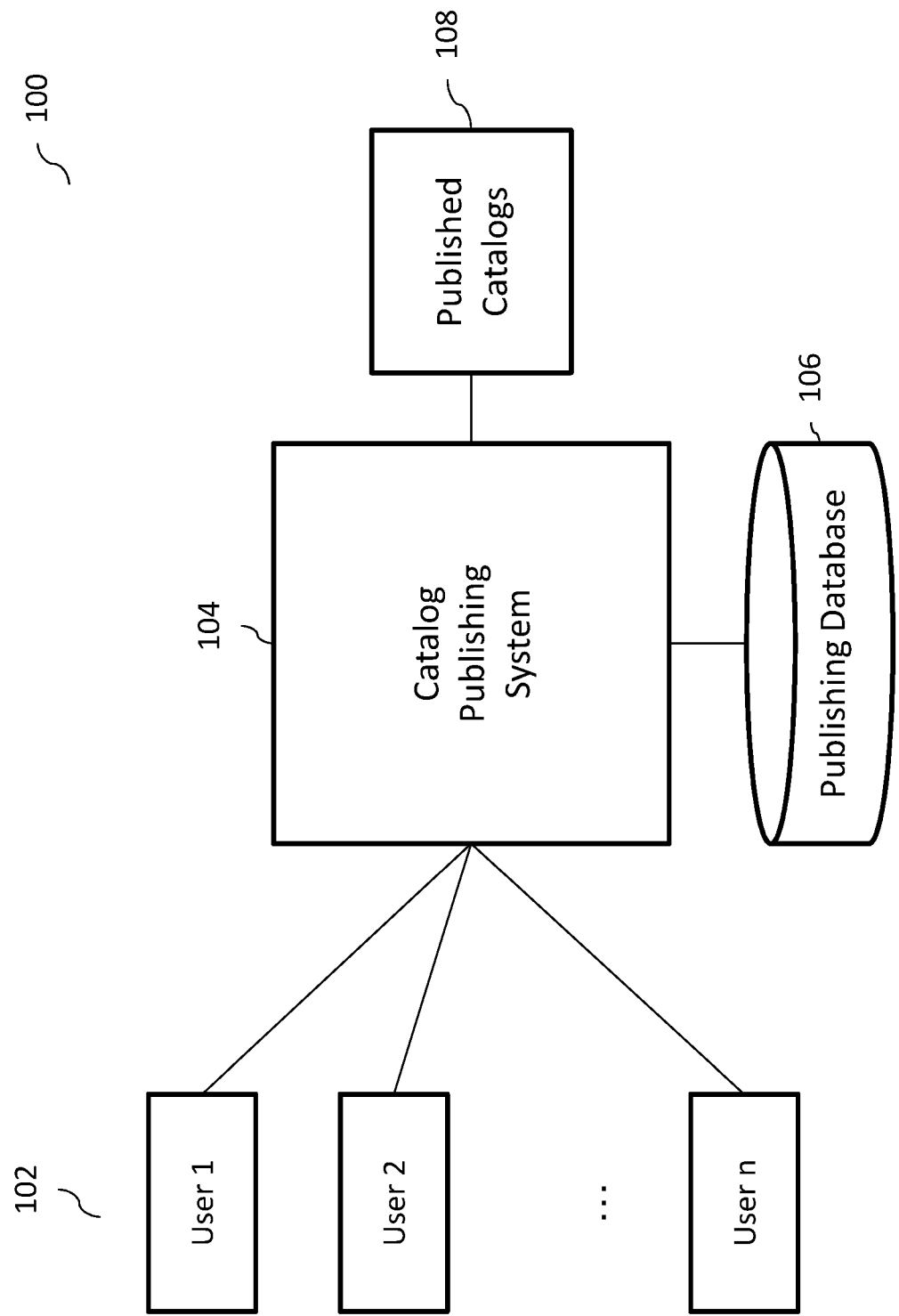
FIG. 1a illustrates an exemplary system for managing catalog publishing processes, according to some implementations of the current subject matter.

FIG. 1a illustrates an exemplary system 100 for managing catalog publishing processes, according to some implementations of the current subject matter. The system 100 may be configured to operate in one or more clustered computing environments, one or more cloud environments, etc. It may include one or more users, entities, applications, etc. 102 (e.g., user 1, user 2, ..., user n, etc.), which may include one or more catalog owner users, catalog publisher users, administrator users, etc., a catalog publishing system 104, and a database 106. In some implementations, the users 102 may be associated with different buyers and/or customers, where catalogs published from the same buyer and/or customer may carry same and/or different publishing priority. The system 104 may include one or more computing elements, which may, for example, as discussed below, include one or more processors, one or more servers, one or more computing engines, one or more memory and/or storage locations, one or more databases, etc. The catalog publishing system 104 may be configured to execute publishing of one or more catalogs that may be provided to it by one or more users 102 as input and, as a result of its internal processing, may output one or more published catalogs 108.

The system 104 may include a processor, a memory, and/or any combination of hardware/software, and may be configured to allow one or more users 102 to communicate with the catalog publishing system 104 to perform one or more tasks associated with catalog publishing, as will be discussed below. The tasks may be configured to rely on data, functions and/or features (and/or any combination thereof) of one or more computing components such that the task is an integration and/or a combination of one or more computing components. The computing components of the system 104 may refer to a software code that may be configured to perform a particular function, a piece and/or a set of data (e.g., publishing data unique to a particular user 102 and/or data available to a plurality of users) and/or configuration data used to create, modify, etc. one or more software functionalities associated with a particular task, sub-task, and/or a portion of a publishing task. The system 104 may include one or more artificial intelligence and/or learning capabilities that may rely on and/or use various data, e.g., data various catalog publishing data, metadata, publishing rules, priority rules, cleansing rules, etc., as will be discussed below.

The elements of the system 100 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Moreover, the elements of the system 100 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

Figure 1B:
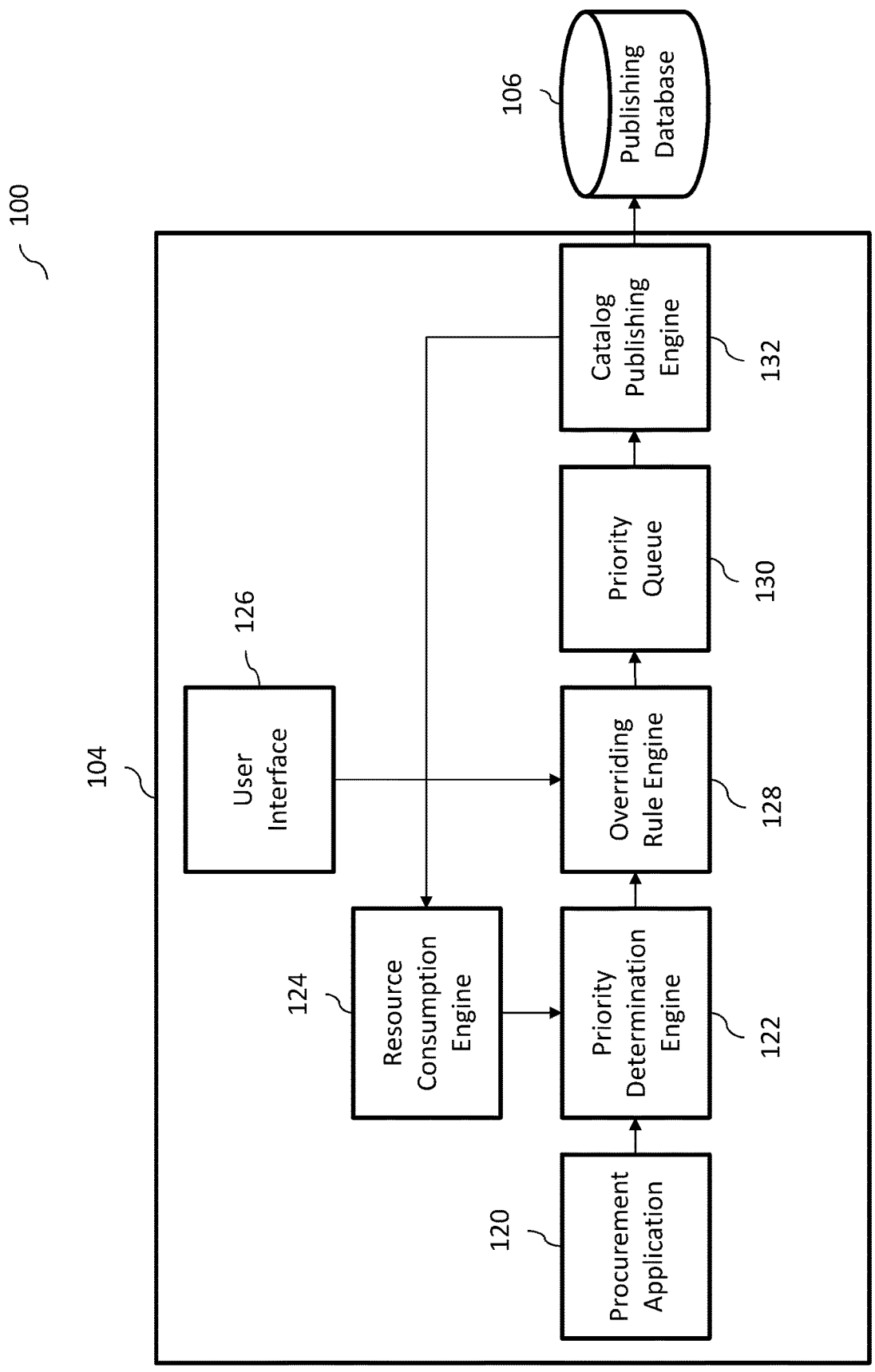
FIG. 1B illustrates additional detail of the system shown in FIG. 1a, according to some implementations of the current subject matter.

FIG. 1B illustrates additional detail of the system 100 shown in FIG. 1a. In particular, FIG. 1B illustrates various components that the catalog publishing system 104 may include and implement for the purposes of publishing one or more catalogs. The system 104 may be configured to include a procurement application 120, a priority determination processor or engine 122, a resource consumption processor or engine 124, a user interface (e.g., an administrator user interface) 126, an overriding rules engine 128, a priority queue 130, and a catalog publishing engine 132.

The system 104 may be configured to execute publication of catalogs that may include one or more catalog items. A catalog may refer to a collection of catalog items that may be provided by a supplier entity (e.g., a catalog source entity). A supplier entity may be an entity that may provide various items for sale, distribution, etc. to a buyer entity (e.g., an entity that may purchase products) and may publish multiple catalogs. A catalog may include a unique name. A catalog item may refer to an item identified in the catalog and corresponding to a product that may be available for purchase from the supplier entity. For example, a catalog item may be directly added to a shopping cart of an online store for immediate purchase and/or added to a contract for a more involved purchase (e.g., recurring purchase, a purchase combining multiples of multiple items, etc.). Publishing may refer to transmitting data associated with the a particular catalog to a server and/or processor associated with a communication network (e.g., Internet, etc.) that may be configured to execute one or more processes associated with making the published catalog available for display, access, browsing, querying, etc. by one or more computing devices having access to the communication network.

FIG. 4 illustrates an exemplary catalog item 400, according to some implementations of the current subject matter. The catalog item 400 may include one or more field names and associated values. As shown in FIG. 4, the field names may include a "Supplier ID", a "Supplier Part ID", etc. The corresponding field values may include "Acme Corp", "12345", etc. As can be understood, the catalog item 400 may include any other fields and/or corresponding field values.

A catalog publish operation that may be performed by the system 104 may refer to an operation during which contents of a catalog may become available to one or more catalog users (e.g., end users purchasing items from the catalog) so that the items may be configured to be listed (e.g., show up) in a catalog search and subsequently, may be added to a shopping cart, etc. This operation may be performed automatically and/or manually (e.g., by an administrator user). A catalog publish operation may include at least one of the following types: a full catalog publish operation, an incremental catalog publish operation, and any combination thereof.

During a full catalog publish operation, a catalog name and/or a set of items may be provided to the system 104 for publishing (e.g., either automatically and/or manually (e.g., by the administrator user)). To execute the full catalog publish operation, the system 104 may be configured to check whether a catalog with a particular name may already exist (e.g., stored in the database 106). If so, the system 104 may be configured to delete the catalog items that may have been already published in the previous publication. Then, the system 104 may execute publishing of any items that have not been previously published.

During the incremental catalog publish operation, the system 104 may be configured to be provided with one or more sets of catalog items (along with the catalog name), which may include at least one of the following: new/updated catalog items (e.g., items that may need to be added/updated), deleted catalog items (e.g., items that may need to be deleted), and any combination thereof. The sets of catalog items may be provided automatically and/or manually to system 104 (e.g., by the administrator user). Any new/updated items may be added if they do not already exist and/or updated if they already exist in the catalog with a particular name. The items requested for deletion may be deleted.

In some implementations, the system 104 may be configured to execute a catalog publish job, which may refer to a data structure that may have all details that may be required for publishing a catalog. The details may include at least one of the following: a catalog name, a type of publishing, catalog items, and/or any other information/data/metadata.

As shown in FIG. 1B, the procurement application 120 may be configured to transmit one or more catalog publish jobs (either one after another and/or simultaneously) from multiple buyer entities to the priority determination engine 122. The priority determination engine 122 may be configured to determine priority for every catalog publish job that is received by the system 104. The priority may refer to an order in which catalog publish jobs are executed. The priority determination engine 122 may be configured to execute a query to the resource consumption engine 124 to determine resources that may have been consumed by the buyer associated with the received catalog publish job in the past. In some implementations, the resource consumption engine 124 may be configured to store various historical data (e.g., aggregated historical data) associated with publishing requests received from various buyers. The resource consumption engine 124 may be configured to identify one or more parameters and/or any other information associated with catalog publish job(s) and provide them to the priority determination engine 122.

The priority of each catalog publish job may depend on a variety of parameters (as will be discussed below), including parameters that may be associated with the specific catalog publish job for which priority is being determined, other catalog publish jobs, types of catalog publish jobs, various rules that may be associated with one or more catalog publish jobs, entities, etc. In some implementations, the parameters may be associated with completed catalog publish jobs from one or more historical periods (e.g., a recent past), where the data associated with each catalog publish job may be provided to the resource consumption engine 124 to update the catalog publish job data/information stored therein. The resource consumption engine 124 may be configured to provide this information to the priority determination engine 122 which may be configured to analyze one or more of the received information/parameters and determine priority for a particular catalog publish job. In particular, whenever a new catalog publish job is received, the current subject matter system 100 may be configured to determine its priority and provide the determined priority to the priority queue 130. In some cases, the priority queue might be generated using a predetermined schedule, automatically, and/or in any other way (e.g., it might not be generated every time a new catalog publish job is received). When a new catalog publish job is added to the priority queue, priority positions of existing catalog publish jobs already in the priority queue may be rearranged accordingly. Additional details of priority determination are discussed below.

Once the priority for each catalog publish job has been determined, the priority determination engine 122 may be configured to transmit the priority data to the overriding rules engine 128. The overriding rules engine may be configured to, optionally, update and/or modify the determined priority (e.g., make the determined priority higher, lower, etc.) of the catalog publish job based on one or more overriding rules. In some exemplary, non-limiting implementations, the overriding rules engine 128 may be configured to detect one or more triggering parameters (e.g., specific supplier, specific items, urgency of requests, availability of resources, etc.) associated with a specific catalog publish jobs and may automatically trigger application of one or more overriding rules to override the determined priority of that catalog publish job. Alternatively, or in addition, the overriding rules may be configured by a user (e.g., administrator user) using the user interface 126. The user interface 126 may be accessible to various users (e.g., administrator users of the procurement application 120).

A non-limiting example of overriding rules that may be applied by the overriding rules engine 128 may include: "Buyer b1 has a special sale campaign this weekend. Hence, during this period, increase the priority of all catalog publish jobs from b1 to maximum so that they never wait". Alternatively, the overriding rules may be more complex, for example, and state "Buyer b2's has special sales campaigns during Christmas & Black Friday every year. Two days prior to these dates, bump up the priority of all catalog publish jobs from b2 to the maximum, so that they never wait".

Once the priorities of one or more catalog publish jobs are determined and/or updated as a result of application of overriding rules by the overriding rules engine 128, the catalog publish jobs together with associated priorities may be transmitted to the priority queue 130. In the priority queue 130, catalog publish jobs with the highest priority are positioned at the top of the queue and may be transmitted to the catalog publishing engine 132. The system 104 may be configured to automatically transmit higher-priority catalog publish jobs to the catalog publishing engine 132, for example, upon detection of parameters (e.g., supplier, catalog items, date, etc.) identifying catalog publish job's higher priority. Alternatively, or in addition to, the catalog publish job with the highest priority may be transmitted (e.g., automatically, manually, and/or otherwise) to the catalog publishing engine 132 upon receiving a request from the catalog publishing engine 132 for the next highest priority catalog publish job. The catalog publishing engine 132 may also be configured to periodically access the priority queue 130 and extract next highest priority catalog publish jobs from the priority queue 130 for publishing.

Upon receiving the catalog publish job, the catalog publishing engine 132 may be configured to execute the catalog publish job and update any publishing data associated with the catalog items that may have been provided in view of a type of a catalog publish job. Moreover, the catalog publishing engine 132 may be configured to, subsequent to executing the catalog publish job, to transmit an update as to availability of its publishing resources (e.g., availability to execute catalog publish jobs) to the resource consumption engine 124. The update may include data/information associated with resources that may have been consumed during execution of the catalog publish job. The data/information may include at least one of the following: number of items, number of enrichment rules, number of cleansing rules, and/or any other data/information associated with the catalog publish job. This data/information may be merged with the data/information stored by the resource consumption engine 124 and may be used to determine priority for any future catalog publish jobs.

Figure 2:
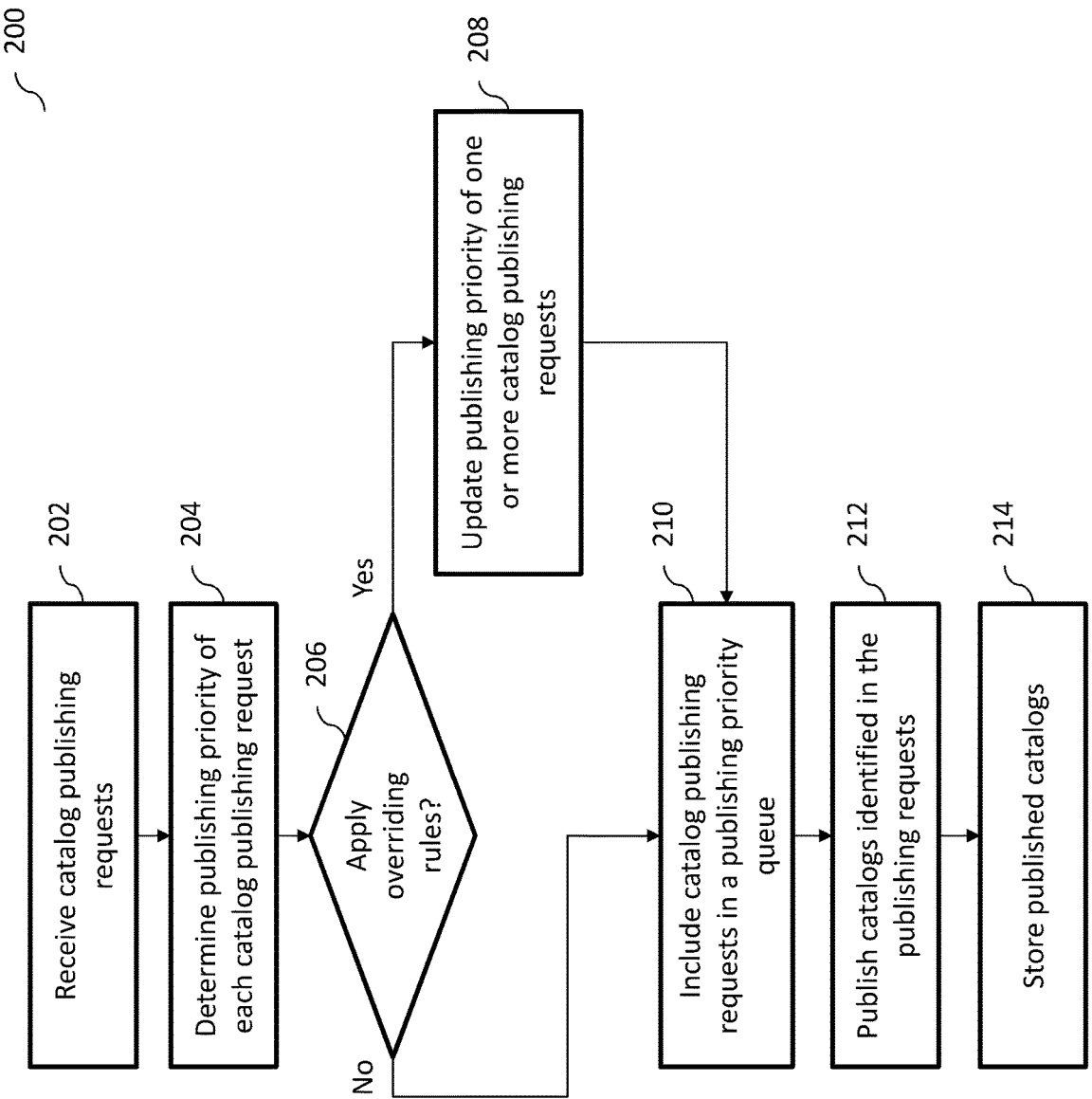
FIG. 2 illustrates an exemplary catalog publish job process, according to some implementations of the current subject matter.

FIG. 2 illustrates an exemplary catalog publish job process 200, according to some implementations of the current subject matter. The process 200 may be configured to be executed by the system 100 shown in FIGS. 1a-b. At 202, one or more catalog publishing requests may be received by the system 104 shown in FIGS. 1a-b. In particular, as discussed above, upon receiving the catalog publishing requests, the procurement application 120 may be configured to transmit one or more catalog publish jobs to the priority determination engine 122.

At 204, the priority determination engine 122 may be configured to determine priority of each catalog publish job received by the system 104 and transmitted by the procurement application 120. The priority determination engine 122 along with the resource consumption engine 124 may be configured to determine priority for execution of the received catalog publish jobs based on various historical data/information (e.g., number of items, number of cleansing rules, number of enrichment rules, etc. associated with catalog publish requests) stored by the resource consumption engine 124.

At 206, the system 104 may be configured to determine whether one or more overriding rules may need to be applied to one or more received catalog publish jobs. If so, the overriding rules engine 128 may be configured to update and/or modify the determined priority (e.g., make the determined priority higher, lower, etc.) of one or more received catalog publish jobs based on one or more overriding rules (as discussed above), at 208. Once the priority of one or more catalog publish jobs has been updated, the catalog publish jobs with the updated priority are transmitted to the priority queue 130, which may be generated by the system 104 based on the received catalog publish jobs and their corresponding priorities. In the priority queue 130, the catalog publish jobs may be organized based on their corresponding determined and/or updated priorities (e.g., from highest to the lowest). The priority queue 130 may already exist and/or may be newly generated by the system 104.

If, at 206, no overriding rules are to be applied to one or more received catalog publish jobs, the priority determination engine 122 may be configured to transmit the catalog publish jobs along with their priorities (e.g., as originally determined by the priority determination engine 122) to the generated queue 130, at 210.

The catalog publish jobs may then be transmitted to the catalog publishing engine 132 for publishing, at 212. As stated above, the system 104 may be configured to automatically transmit higher-priority catalog publish jobs to the catalog publishing engine 132 upon detection of various parameters identifying catalog publish job's higher priority. Alternatively, or in addition to, the catalog publish job with the highest priority may be transmitted to the catalog publishing engine 132 upon receiving a request from the catalog publishing engine 132 for the next highest priority catalog publish job. The catalog publishing engine 132 may be configured to execute the catalog publish job (at 212) and update any publishing data associated with the catalog items that may have been provided in view of a type of a catalog publish job as well as store published catalogs and/or any associated data in a database 106 and/or any other storage location, at 214.

Figure 3:
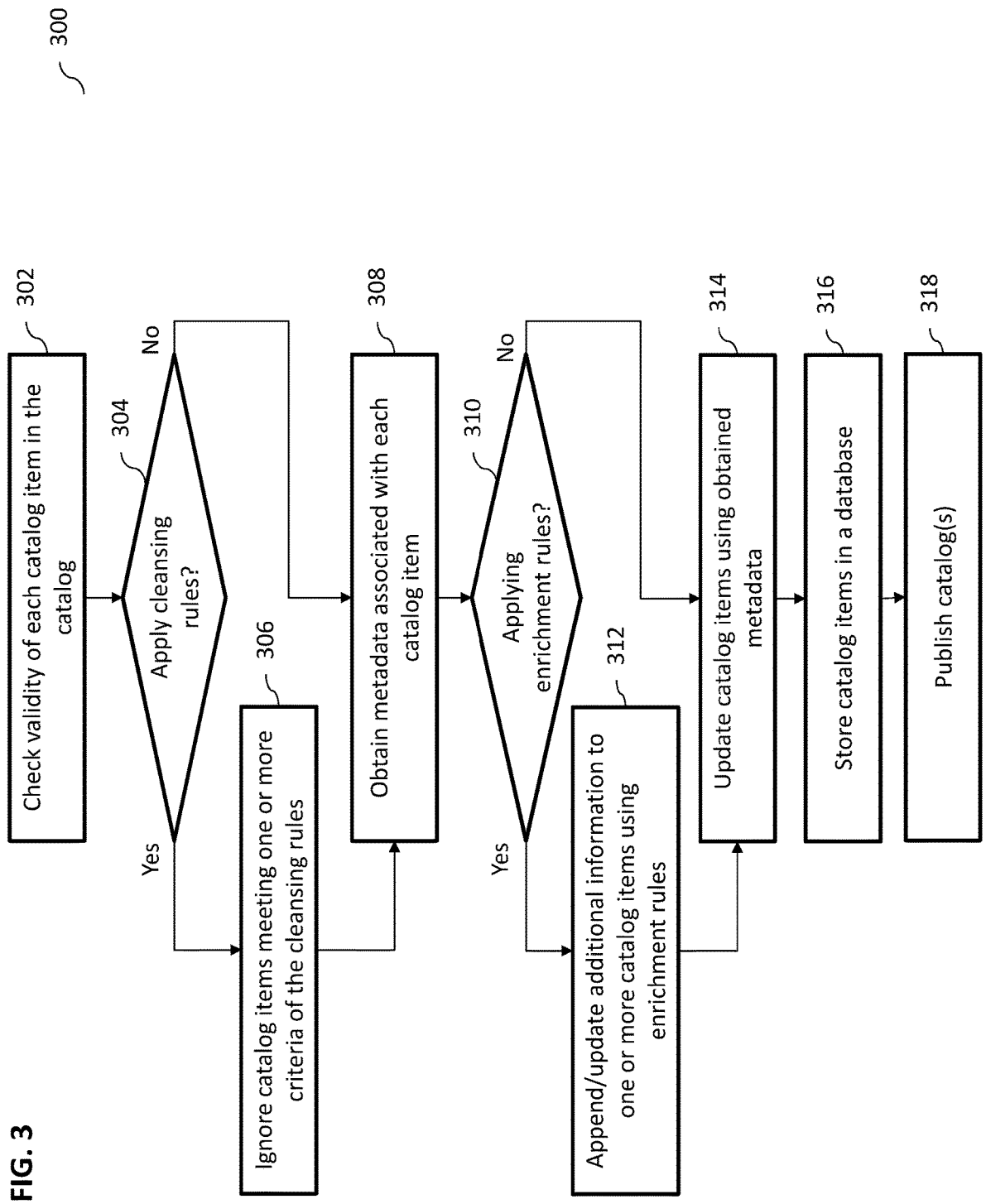
FIG. 3 illustrates an exemplary catalog publish job execution process, according to some implementations of the current subject matter.

FIG. 3 illustrates an exemplary catalog publish job execution process 300, according to some implementations of the current subject matter. The catalog publish job execution process 300 may be executed by the system 104 shown in FIGS. 1a-b, and in particular, the catalog publishing engine 132.

The catalog publish job execution process may begin with checking of syntax of the catalog items identified by the catalog publish job. At 302, catalog items provided may be checked for validity. For example, the engine 132 may be configured to ensure that all mandatory parameters or fields associated with each catalog item have been provided, the associated values are valid, etc. The engine 132 may be configured to process each catalog item once to determine its validity. If any of the catalog items are not valid, an error message may be generated and/or transmitted to the user interface 126. The engine 132 may be configured to skip publishing the invalid items and/or wait for corrections to those items. In the latter case, the engine 132 may be configured to execute publishing of catalog publish jobs having the next highest priority. The computation during 302 may be proportional to the number of catalog items since each item is processed once, as will be shown by equation (1) below.

At 304, the engine 132 may be configured to determine whether any catalog cleansing rules need to be applied to the catalog items. If not, the process 300 may proceed to 308, otherwise, the process 300 may proceed to 306. One or more cleansing rules may be specified automatically and/or manually (e.g., by a user using user interface 126, where the user may be a catalog administrator user). The rules may indicate that during execution of publish jobs, one or more catalog items that meet certain criteria identified by the rules may be ignored from cleansing, at 306. For example, if an expiration data specified inside the catalog item (e.g., "Expiration Date: 'Jan. 1, 2000'" in the catalog item 400, as shown in FIG. 4) is older than the current data, the engine 132 may ignore that catalog item (e.g., not publish it, and/or publish it with the associated data). Other non-limiting examples of cleansing rules may include deleting catalog items that have a manufacturer name that is not in a specific list of names (e.g., this information may be supplied during configuration of the cleansing rule(s)); if the expiration date of a catalog item is earlier than the current date, discard the catalog item; if the lead time of a catalog item is greater than a 14 (e.g., it takes more than 2 weeks to get the item delivered) (e.g., this information may also be supplied during configuration of the cleansing rule(s)), discard the catalog item; etc. The computation during 304-306 may be proportional to the number of catalog items plus the number of cleansing rules, as will be shown by equation (1) below.

At 308, the engine 132 may be configured to obtain metadata associated with each catalog item identified in the catalog publish job. For example, prior to processing of any catalog items identified in the catalog publish job, the engine 132 may be configured to query and receive, from the procurement application 120, any catalog master data. The master data may include at least one of the following: supplier entity master data, buyer entity master data, and/or any other master data. The computation during 308 may be constant, as will be shown by equation (1) below.

At 310, the engine 132 may be configured to determine whether any enrichment rules may need to be applied to one or more catalog items in the catalog publish job. Similar to the cleansing rules, one or more enrichment rules may be defined and/or triggered automatically and/or manually (e.g., by a user (e.g., administrator user) using user interface 126). If the enrichment rules are to be applied, the process 300 proceeds to 312, where additional information may be appended to and/or existing data in the fields may be updated/added/overwritten/deleted/etc. in connection with one or more catalog items based on the application of the enrichment rules, otherwise, the process 300 may proceed to 314. The enrichment rules may be configured to specify rules for enriching one or more catalog items. For example, if "supplier id"="s1" and "supplier part id"="p1", the engine 132 may set "is_green" field to "yes". In some implementations, instead of explicitly providing specific rules (e.g., like the above), the engine 132 may be configured to query and/or access a rules lookup table. The rules lookup table may include one or more fields specifying supplier identifiers (IDs), supplier part IDs, etc. Various field values associated with the fields may also be specified (e.g., is_green field values may be specified in a .csv file, etc.). Some additional examples of enrichment rules may include, but are not limited to, if a lookup table is not used, update a value of a catalog field Green based on a commodity code field value of the catalog item; if the lookup table is used, update the value of a region catalog field based on supplier name, Supplier PartID and manufacturer name values, using the following "SupplierName, SupplierPartId, ManufacturerName, Region", "Blue Corp, AD15156, Hallmark Cables, Region1", "Blue Corp, AD15157, Hallmark Cables, Region2"; etc. The computation during 312 may be proportional to the number of catalog items, the number of explicit enrichment rules and the sum of values in all the lookup tables, as will be shown by equation (1) below.

At 314, the engine 132 may be configured to execute one or more catalog item transformations by updating catalog items using the obtained metadata. Using the metadata received from the procurement application 120, the engine 132 may update one or more catalog items. For example, the engine 132 may update a currency of a price for one or more catalog items. The computation during 314 may be proportional to the number of catalog items, as illustrated by equation (1) below.

At 316, the engine 132 may be configured to update the catalog item information in the database 106 and/or any other storage location (e.g., local storage). For example, the catalog items may be stored in a local database, which may be different from a storage location of any publishing data. This may allow retrieving the catalog items of a catalog that may be required during a subsequent full publish and/or a catalog/catalog item deactivation operation. The computation during 316 may be proportional to the number of catalog items.

At 318, the engine 132 may be configured to execute the catalog publishing operation. The computation during 318 may be proportional to the number of catalog items.

In some implementations, priority of catalogs and/or catalog items may be determined/depend based on one or more of the following parameters during a predetermined period of time (e.g., last 7 days): a number of incremental catalog publish jobs ($N_{ip}$), a number of full catalog publish jobs ($N_{fp}$), a number of catalog items processed ($N_i$), a number of cleansing rules ($N_c$), a number of enrichment rules with no lookup files ($N_e$), a sum of entries in lookup files used during enrichment ($N_{el}$), and/or any other parameters, and/or any combination thereof. Using the above parameters, the priority may be determined as follows:

$$\text{Priority}=N_{ip}+1.2*N_{fp}W_i*N_i*(1+W_c*N_c+W_e*N_e+W_e*0.5*N_{el}) \quad (1)$$

where $W_i$ is a weight for a particular catalog item, $W_c$ is a weight for a single cleansing rule, and $W_e$ is a weight for a single enrichment rule without lookups. The numerical factors about may be experimentally determined. Using numerical values for the above variables, priority may be expressed as follows:

$$143.25=100+1.2*10+0.005*5000*(1+0.001*100+0.002*50+0.002*0.5*50)$$

For a single incremental catalog publish job (i.e., $N_{ip}=1$), the weight is 1. For a full publish catalog publish, the weight is 20% of an incremental catalog publish (as it involves deleting existing catalog items first). Further, the higher the number, the lower the priority. In order words, the engine 132 will select catalog publish job that has the smallest priority number as computed using equation (1), which would correspond to the highest priority for publishing.

The following examples illustrate operation of the processes 200-300 shown in FIGS. 2-3. In the examples below, a format of the catalog publish job is as follows: <buyer-id>(<subscription-id>).

Example 1

Incoming catalog publish job order (left-most one is the earliest, right-most one is most recent) received by the procurement application 120 may be expressed as follows:

c1(1), c1(2), c1(3), c1(4), c1(5), c2(1), c3(1), c4(1), c5(1)

Using conventional first come first serve basis, execution of the catalog publish jobs would be the same as above:

c1(1), c1(2), c1(3), c1(4), c1(5), c2(1), c3(1), c4(1), c5(1)

Using processes 200-300, execution of the catalog publish jobs may be as follows:

c1(1), c2(1), c3(1), c4(1), c5(1), c1(2), c1(3), c1(4), c1(5)

It should be noted that only one catalog publish job from buyer entity c1 may be scheduled first and any of its subsequent catalog publish jobs may be executed only after executing catalog publish jobs from other buyer entities.

Example 2

Incoming catalog publish job order (left-most one is the earliest, right-most one is most recent) received by the procurement application 120 may be expressed as follows:

c1(1), c1(2), c1(3), c1(4), c1(5), c2(1), c2(2), c3(1), c3(2), c4(1), c4(2), c5(1), c5(2)

Using conventional first come first serve basis, execution of the catalog publish jobs would be the same as above:

c1(1), c1(2), c1(3), c1(4), c1(5), c2(1), c2(2), c3(1), c3(2), c4(1), c4(2), c5(1), c5(2)

Using processes 200-300, execution of the catalog publish jobs may be as follows:

c1(1), c2(1), c3(1), c4(1), c5(1), c1(2), c2(2), c3(2), c4(2), c5(2), c1(3), c1(4), c1(5)

Figure 5:
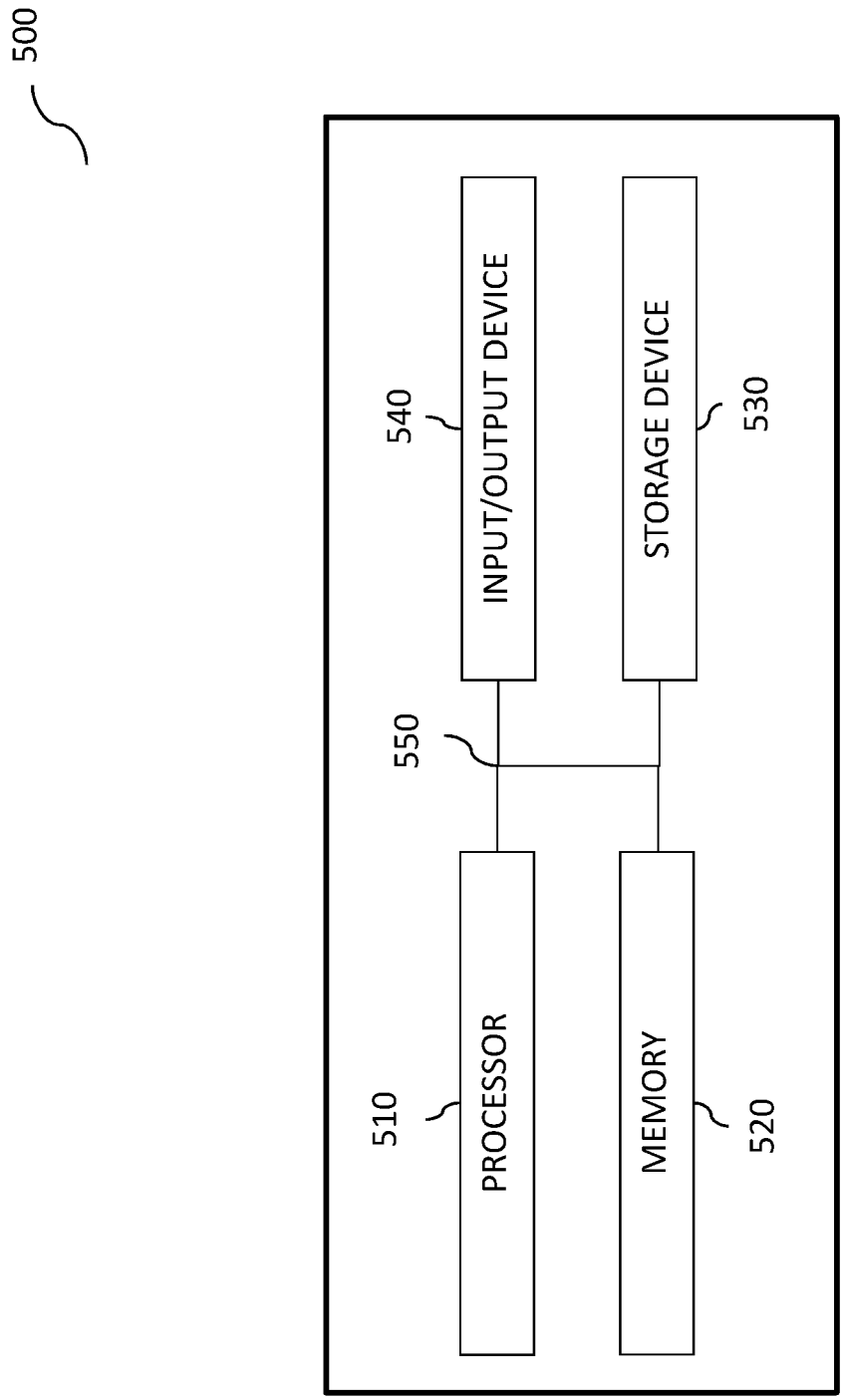
FIG. 5 is an exemplary system, according to some implementations of the current subject matter.

In some implementations, the current subject matter may be configured to be implemented in a system 500, as shown in FIG. 5. The system 500 may include a processor 510, a memory 520, a storage device 530, and an input/output device 540. Each of the components 510, 520, 530 and 540 may be interconnected using a system bus 550. The processor 510 may be configured to process instructions for execution within the system 500. In some implementations, the processor 510 may be a single-threaded processor. In alternate implementations, the processor 510 may be a multi-threaded processor. The processor 510 may be further configured to process instructions stored in the memory 520 or on the storage device 530, including receiving or sending information through the input/output device 540. The memory 520 may store information within the system 500. In some implementations, the memory 520 may be a computer-readable medium. In alternate implementations, the memory 520 may be a volatile memory unit. In yet some implementations, the memory 520 may be a non-volatile memory unit. The storage device 530 may be capable of providing mass storage for the system 500. In some implementations, the storage device 530 may be a computer-readable medium. In alternate implementations, the storage device 530 may be a floppy disk device, a hard disk device, an optical disk device, a tape device, non-volatile solid state memory, or any other type of storage device. The input/output device 540 may be configured to provide input/output operations for the system 500. In some implementations, the input/output device 540 may include a keyboard and/or pointing device. In alternate implementations, the input/output device 540 may include a display unit for displaying graphical user interfaces.

Figure 6:
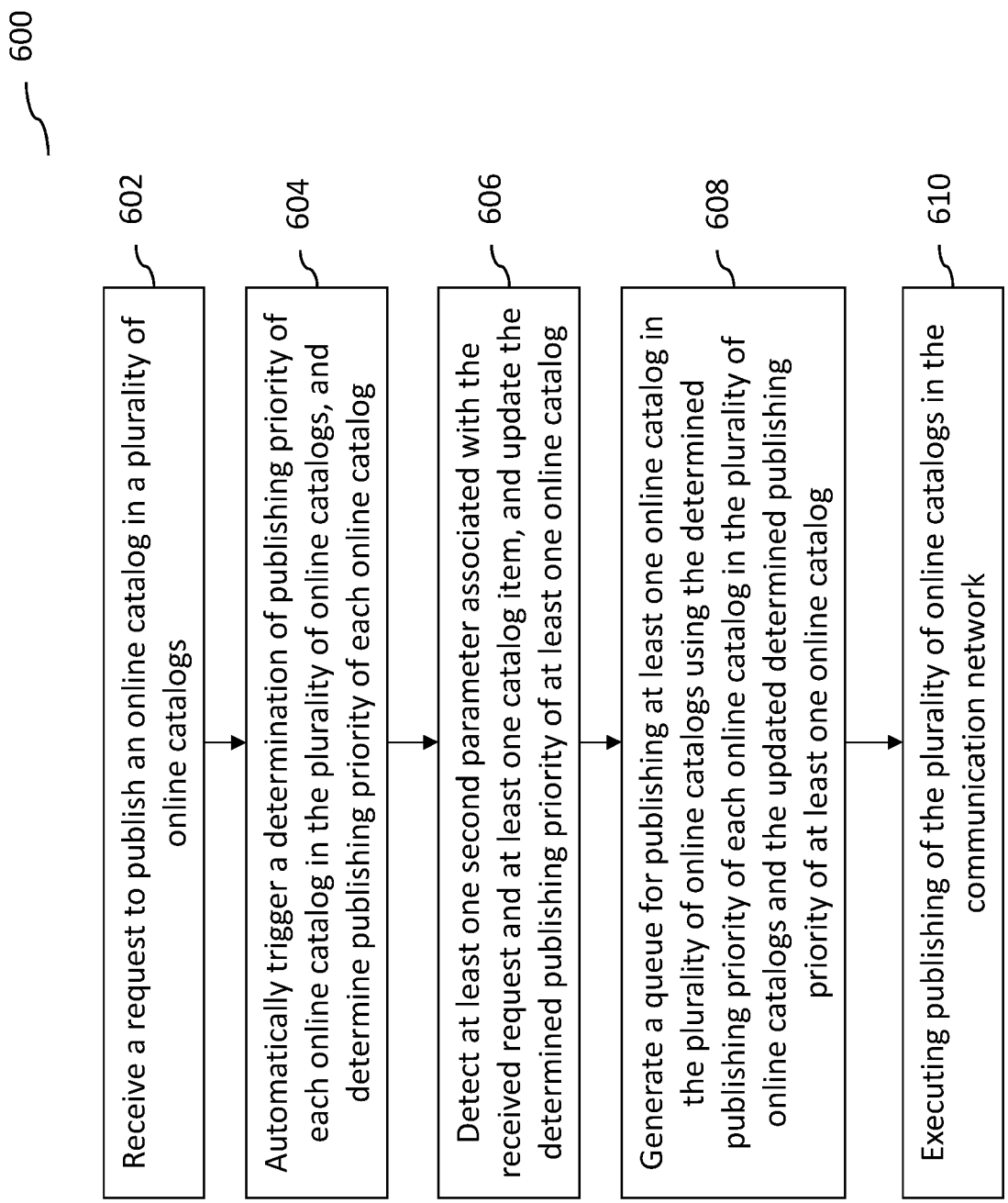
FIG. 6 is an exemplary method, according to some implementations of the current subject matter.

FIG. 6 illustrates an exemplary method 600 for executing catalog publishing, according to some implementations of the current subject matter. The method 600 may be performed by the system shown in FIGS. 1*a-b* and in particular the catalog publishing system 104. At 602, a request to publish an online catalog in a plurality of online catalogs may be received. For example, procurement application 120 may be configured to receive such request. Each online catalog may include of a plurality of catalog items (e.g., items 400 shown in FIG. 4). The online catalog may be configured to be published in a communication network (e.g., an electronic catalog published on the Internet and/or any other external and/or internal network).

At 604, the system 104 may be configured to automatically trigger, based on at least one first parameter associated with at least one of the received request and at least one catalog item in at least one online catalog in the plurality of online catalogs, a determination of publishing priority of each online catalog in the plurality of online catalogs. For example, the priority determination engine 122, along with resource consumption engine 124, may be configured to determine publishing priority of each online catalog in the plurality of online catalogs.

At 606, at least one second parameter associated with the received request and at least one catalog item in at least one online catalog may be detected. The second parameter may correspond to one or more overriding rules (e.g., as used by the overriding rules engine 128). Based on the detecting, the overriding rules engine 128 may update the determined publishing priority of at least one online catalog.

At 608, a queue for publishing of at least one online catalog in the plurality of online catalogs using the determined publishing priority of each online catalog in the plurality of online catalogs may be generated. The queue may be generated by the priority queue component 130. The queue 130 may include the updated determined publishing priority of at least one online catalog in the plurality of online catalogs.

At 610, the engine 132 may be configured to execute, using the generated queue, publishing of the plurality of online catalogs in the communication network.

In some implementations, the current subject matter may include one or more of the following optional features. One or more online catalogs in the plurality of online catalogs may be published using at least one of the following: an incremental catalog publishing, a full catalog publishing, and any combination thereof. An incremental catalog publishing may include publishing one or more items of one or more catalogs in the plurality of online catalogs. A full catalog publishing may include publishing all items included in one or more catalogs.

In some implementations, the first parameter (e.g., priority parameter) may include at least one of the following: a number of incremental catalog publishings, a number of full catalog publishings, a number of catalog items included in the one or more online catalogs, a number of cleansing rules applicable to one or more catalog items included in the one or more online catalogs, a number of enrichment rules applicable to one or more catalog items included in the one or more online catalogs, and any combination thereof. Execution of a cleansing rule may be configured to exclude one or more catalog items from being published together with the one or more online catalogs. An execution of an enrichment rule may be configured to add and/or update data to one or more items in one or more online catalogs for publishing.

In some implementations, the second parameter (e.g., overriding rules parameter) may be associated with one or more overriding rules being indicative of a change in publishing priority of at least one online catalog in the plurality of online catalogs.

In some implementations, each catalog item may be published using metadata associated with a corresponding online catalog in the plurality of online catalogs.

In some implementations, a highest value of a priority determined for an online catalog in the plurality of online catalogs using at least one second parameter may correspond to a lowest publishing priority of the online catalog in the generated queue.

In some implementations, the method 600 may also include storing the published online catalogs at a storage location.

In some implementations, the generated priority queue may include at least one of the following: an existing priority queue (e.g., priority queue that may already exist and new catalog publish jobs may be added to it), a newly generated priority queue, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
receiving a request to publish an online catalog in a plurality of online catalogs, each online catalog in the plurality of online catalogs including of a plurality of catalog items, each online catalog is configured to be published in a communication network;
automatically triggering, based on at least one first parameter associated with at least one of the received request and at least one catalog item in at least one online catalog in the plurality of online catalogs, a determination of publishing priority of each online catalog in the plurality of online catalogs, and determining publishing priority of each online catalog in the plurality of online catalogs;
detecting at least one second parameter associated with the at least one received request and the at least one catalog item in at least one online catalog in the plurality of online catalogs, and based on the detecting, updating the determined publishing priority of at least one online catalog in the plurality of online catalogs;
generating a queue for publishing at least one online catalog in the plurality of online catalogs using the determined publishing priority of each online catalog in the plurality of online catalogs and the updated determined publishing priority of at least one online catalog in the plurality of online catalogs; and
executing, using the generated queue, publishing of the plurality of online catalogs in the communication network.

2. The method according to claim 1, wherein one or more online catalogs in the plurality of online catalogs are published using at least one of the following: an incremental catalog publishing, a full catalog publishing, and any combination thereof;
wherein incremental catalog publishing includes publishing one or more items of one or more catalogs in the plurality of online catalogs, and full catalog publishing includes publishing all items included in the one or more catalogs in the plurality of online catalogs.

3. The method according to claim 2, wherein the at least one first parameter includes at least one of the following: a number of incremental catalog publishings, a number of full catalog publishings, a number of catalog items included in the one or more online catalogs, a number of cleansing rules applicable to one or more catalog items included in the one or more online catalogs, a number of enrichment rules applicable to one or more catalog items included in the one or more online catalogs, and any combination thereof;
wherein an execution of a cleansing rule is configured to exclude one or more catalog items from being published together with the one or more online catalogs, and an execution of an enrichment rule is configured to add and/or update data to one or more items in the one or more online catalogs for publishing.

4. The method according to claim 3, wherein the at least one second parameter is associated with one or more overriding rules being indicative of a change in publishing priority of the at least one online catalog in the plurality of online catalogs.

5. The method according to claim 1, wherein each catalog item is published using metadata associated with a corresponding online catalog in the plurality of online catalogs.

6. The method according to claim 1, wherein a highest value of a priority determined for an online catalog in the plurality of online catalogs using at least one second parameter corresponds to a lowest publishing priority of the online catalog in the generated queue.

7. The method according to claim 1, further comprising storing the published online catalogs at a storage location.

8. The method according to claim 1, wherein the generated priority queue includes at least one of the following: an existing priority queue, a newly generated priority queue, and any combination thereof.

9. A system comprising:
at least one programmable processor; and
a non-transitory machine-readable medium storing instructions that, when executed by the at least one programmable processor, cause the at least one programmable processor to perform operations comprising:
receiving a request to publish an online catalog in a plurality of online catalogs, each online catalog in the plurality of online catalogs including of a plurality of catalog items, each online catalog is configured to be published in a communication network;
automatically triggering, based on at least one first parameter associated with at least one of the received request and at least one catalog item in at least one online catalog in the plurality of online catalogs, a determination of publishing priority of each online catalog in the plurality of online catalogs, and determining publishing priority of each online catalog in the plurality of online catalogs;
detecting at least one second parameter associated with the at least one received request and the at least one catalog item in at least one online catalog in the plurality of online catalogs, and based on the detecting, updating the determined publishing priority of at least one online catalog in the plurality of online catalogs;
generating a queue for publishing at least one online catalog in the plurality of online catalogs using the determined publishing priority of each online catalog in the plurality of online catalogs and the updated determined publishing priority of at least one online catalog in the plurality of online catalogs; and
executing, using the generated queue, publishing of the plurality of online catalogs in the communication network.

10. The system according to claim 9, wherein one or more online catalogs in the plurality of online catalogs are published using at least one of the following: an incremental catalog publishing, a full catalog publishing, and any combination thereof;
wherein incremental catalog publishing includes publishing one or more items of one or more catalogs in the plurality of online catalogs, and full catalog publishing includes publishing all items included in the one or more catalogs in the plurality of online catalogs.

11. The system according to claim 10, wherein the at least one first parameter includes at least one of the following: a number of incremental catalog publishings, a number of full catalog publishings, a number of catalog items included in the one or more online catalogs, a number of cleansing rules applicable to one or more catalog items included in the one or more online catalogs, a number of enrichment rules applicable to one or more catalog items included in the one or more online catalogs, and any combination thereof;
wherein an execution of a cleansing rule is configured to exclude one or more catalog items from being published together with the one or more online catalogs, and an execution of an enrichment rule is configured to add and/or update data to one or more items in the one or more online catalogs for publishing.

12. The system according to claim 11, wherein the at least one second parameter is associated with one or more overriding rules being indicative of a change in publishing priority of the at least one online catalog in the plurality of online catalogs.

13. The system according to claim 9, wherein each catalog item is published using metadata associated with a corresponding online catalog in the plurality of online catalogs.

14. The system according to claim 9, wherein a highest value of a priority determined for an online catalog in the plurality of online catalogs using at least one second parameter corresponds to a lowest publishing priority of the online catalog in the generated queue.

15. The system according to claim 9, wherein the operations further comprise storing the published online catalogs at a storage location.

16. The system according to claim 9, wherein the generated priority queue includes at least one of the following: an existing priority queue, a newly generated priority queue, and any combination thereof.

17. A computer program product comprising a non-transitory machine-readable medium storing instructions that, when executed by at least one programmable processor, cause the at least one programmable processor to perform operations comprising:
  receiving a request to publish an online catalog in a plurality of online catalogs, each online catalog in the plurality of online catalogs including of a plurality of catalog items, each online catalog is configured to be published in a communication network;
  automatically triggering, based on at least one first parameter associated with at least one of the received request and at least one catalog item in at least one online catalog in the plurality of online catalogs, a determination of publishing priority of each online catalog in the plurality of online catalogs, and determining publishing priority of each online catalog in the plurality of online catalogs;
  detecting at least one second parameter associated with the at least one received request and the at least one catalog item in at least one online catalog in the plurality of online catalogs, and based on the detecting, updating the determined publishing priority of at least one online catalog in the plurality of online catalogs;
  generating a queue for publishing at least one online catalog in the plurality of online catalogs using the determined publishing priority of each online catalog in the plurality of online catalogs and the updated determined publishing priority of at least one online catalog in the plurality of online catalogs; and
  executing, using the generated queue, publishing of the plurality of online catalogs in the communication network.

18. The computer program product according to claim 17, wherein
  one or more online catalogs in the plurality of online catalogs are published using at least one of the following: an incremental catalog publishing, a full catalog publishing, and any combination thereof;
  incremental catalog publishing includes publishing one or more items of one or more catalogs in the plurality of online catalogs, and full catalog publishing includes publishing all items included in the one or more catalogs in the plurality of online catalogs;
  the at least one first parameter includes at least one of the following: a number of incremental catalog publishings, a number of full catalog publishings, a number of catalog items included in the one or more online catalogs, a number of cleansing rules applicable to one or more catalog items included in the one or more online catalogs, a number of enrichment rules applicable to one or more catalog items included in the one or more online catalogs, and any combination thereof;
  an execution of a cleansing rule is configured to exclude one or more catalog items from being published together with the one or more online catalogs, and an execution of an enrichment rule is configured to add and/or update data to one or more items in the one or more online catalogs for publishing;
  the at least one second parameter is associated with one or more overriding rules being indicative of a change in publishing priority of the at least one online catalog in the plurality of online catalogs.

19. The computer program product according to claim 17, wherein each catalog item is published using metadata associated with a corresponding online catalog in the plurality of online catalogs.

20. The computer program product according to claim 17, wherein a highest value of a priority determined for an online catalog in the plurality of online catalogs using at least one second parameter corresponds to a lowest publishing priority of the online catalog in the generated queue.

* * * * *